United States Patent
Lin et al.

(10) Patent No.: US 8,209,557 B2
(45) Date of Patent: Jun. 26, 2012

(54) COMPUTER SET PROVIDED WITH A DISK TYPE BATTERY UNIT

(75) Inventors: Yih-Neng Lin, Taipei (TW); Min-Yu Chou, Taipei (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 405 days.

(21) Appl. No.: 12/635,502

(22) Filed: Dec. 10, 2009

(65) Prior Publication Data

US 2011/0099390 A1    Apr. 28, 2011

(30) Foreign Application Priority Data

Oct. 22, 2009    (TW) .............................. 98135750 A

(51) Int. Cl.
*G06F 1/00* (2006.01)
*H02B 1/00* (2006.01)
*H05K 7/02* (2006.01)

(52) U.S. Cl. .... 713/300; 361/600; 361/614; 361/679.31

(58) Field of Classification Search ............... 713/300; 361/600, 614, 679.31
See application file for complete search history.

(56) References Cited

U.S. PATENT DOCUMENTS

| | | | | |
|---|---|---|---|---|
| 5,822,582 | A * | 10/1998 | Doragh et al. | 713/2 |
| 2004/0088456 | A1* | 5/2004 | Zhang | 710/74 |
| 2005/0002217 | A1* | 1/2005 | Liu et al. | 365/145 |
| 2005/0168937 | A1* | 8/2005 | Yin et al. | 361/686 |
| 2006/0028791 | A1* | 2/2006 | Huang et al. | 361/683 |
| 2006/0224782 | A1* | 10/2006 | Ohbitsu | 710/18 |
| 2007/0216355 | A1* | 9/2007 | Kim | 320/128 |
| 2009/0016015 | A1* | 1/2009 | Seibert et al. | 361/686 |

* cited by examiner

*Primary Examiner* — Vincent Tran
(74) *Attorney, Agent, or Firm* — Chun-Ming Shih

(57) ABSTRACT

A computer set for coupling to a disk drive and a battery unit, includes a disk-drive connecting port, a power diverter circuit and a power source. The connecting port includes a set of disk terminals, a set of battery terminals, and a set of power terminals. The diverter circuit is coupled electrically to the connecting port. The power source is electrically coupled to the diverter circuit such that when the computer set is coupled to the disk drive, the sets of disk and power terminals are electrically coupled to the disk drive and the power source supplies a first electrical power for the disk drive via the diverter circuit. When the computer set is coupled to the battery unit, the sets of battery and power terminals are coupled electrically to the battery unit so as to permit the battery unit to supply a second electrical power for the computer set via the diverter circuit.

7 Claims, 6 Drawing Sheets

COMPUTER SET PROVIDED WITH A DISK TYPE BATTERY UNIT

This application claims the benefit of the Taiwan Patent Application Serial NO. 098135750, filed on Oct. 22, 2009, the subject matter of which is incorporated herein by reference.

BACKGROUND OF THE INVENTION

1. Field of the Invention

The present invention relates to a computer set and a battery unit, more particularly to a computer set, which is optionally and electrically coupled to an optical disk drive and a battery unit in the form of a disk drive.

2. Description of the Prior Art

A PC (computer set) plays an important role and becomes indispensable to our daily life. As for a notebook computer, it becomes the most desired tool for a businessman. However, when the notebook computer is used outdoor, where power source is not always available, the user would worry about the power source for operation of the notebook computer.

Generally, there are two ways of power supply to a conventional notebook computer; (i) it is connected to an external power source via a connection cable; (ii) it is provided with a carried-along battery unit. The external power source is not always available anywhere and since the attached battery unit can supply electrical power only for a few hours; the user is often left in a state, where he cannot use the computer when the battery unit runs out of power. How to increase the power of the battery unit is an urgent problem we are facing at this moment.

A conventional way to improve the power of the battery unit is to reduce the occupying space of the hard disk, such as a disk drive, and using the acquired space for accommodating the battery unit. FIG. 1 illustrates a diagram representing a prior art computer set provided with a disk drive. As shown, the computer set 100 includes a processor unit 11, a disk-drive connecting port 12, first power source 13 and a power supply track 14.

The disk-drive connecting port 12 is installed within the holding seat H1, is coupled electrically with the processor unit 11 and includes a set of first data terminals 121 and a set of power transmission terminals 122. The processor unit 11 is coupled electrically to the first power source 13 via the power supply track 14.

When the disk drive 200 provided with a reading module 21 and a second disk-drive connecting port 22 is inserted into the holding seat H1 so as to be coupled electrically with the disk-drive connecting port 12, the set of second data terminals 221 in the second disk-drive connecting port 22 is electrically coupled with the set of first data terminals 121 to transmit the disk data to the processor unit. Under this condition, the set of power reception terminals 222 is coupled electrically with the set of power transmission terminals 122, thereby allowing the first power source 13 to supply electrical power for operation of the disk drive 200.

FIG. 2 illustrates a diagram representing another prior art computer set 300 provided a second battery connecting port 33 and into which a disk drive is inserted. Unlike to the previous computer set 100, the computer set 300 has a second battery connecting port 33 installed with the holding seat H2 in addition to the processor unit 31, the disk-drive connecting port 32, the first power source 34 and the power supply track 35. The second battery connecting port 33 is electrically coupled with the processor unit 31 and the power supply track 35, and includes a set of second battery terminals 331 and a set of second power reception terminals 332.

When the disk drive 200 is inserted into the computer set 300, the first power source 34 supplies a first electrical power P1 to the disk drive 200 via the power transmission terminals 322, a second electrical power P2 to the processor unit 31 and other components (not shown) via the power supply track 35 such that the disk drive 200 transmits a disk data S1 to the processor unit 31 via the set of first data terminals 321.

FIG. 3 illustrates a diagram representing another prior art computer set 300 provided a second battery connecting port 33 and into which a battery unit 400 in the shape of a disk drive is inserted. When the battery unit 400 provided with a first battery connecting port 41 is inserted into the holding seat H2 of the computer set 300 to connect the first and second battery connecting ports 41, 33 together, the set of first power transmission terminals 411 in the first battery connecting port 41 is coupled electrically with the second power transmission terminals 322, thereby supplying a third electrical power P3 to the power supply track 35 for operation of the computer set 300. At this time, the set of first battery terminals 412 is coupled electrically with the set of second battery terminals 331 for transmission of battery data S2 to the computer set 300.

Although the prior art computer set 300 has an improved power capacity due to presence of the battery unit 400 in the holding seat H2, the computer set 300 must have the second battery connecting port 33 for coupling electrically to the battery unit 400. As a result, the second battery connecting port 33 occupying a portion of the interior space for layout of circuit paths and simultaneously increasing the manufacturing expense.

Summarizing the above mentioned facts, the first prior art computer set 100 has a limited power supply, the use must always consider the available amount of the battery power, thereby causing inconvenience. The second prior art computer set 300 provided with the second battery connecting port 33 has increased battery power due to installation of the battery unit 400, a relative interior space is occupied by the battery unit 400, which, in turn, hinders smooth layout of the printed circuits and causes extra manufacturing expense for the manufacturers.

SUMMARY OF THE INVENTION

The main object of the present invention is to provide a computer set and a battery unit in the shape of a disk drive, wherein the computer set utilizes a conventional disk-drive connecting port for coupling electrically with the disk drive or the battery unit, thereby providing an extra power source for operation of the computer set. The battery unit of the disk-drive shape is installed within the computer set of the present invention without the requirement of an extra connecting port.

The computer set of the present invention is coupled optionally to an optical disk drive and a battery unit in the shape of a disk drive. The computer set accordingly includes a first disk-drive connecting port, a power diverter circuit and a first power source. The first disk-drive connecting port includes a set of disk terminals, a set of battery terminals and a set of power terminals. The power diverter circuit is coupled electrically to the first disk-drive connecting port. The first power source is electrically coupled to the power diverter circuit such that when the computer set is optionally coupled to the disk drive, a first electrical power is supplied to the disk drive via the power diverter circuit.

When the computer set is optionally coupled to the disk drive, the sets of disk terminals and power terminals are electrically coupled to the disk drive. When the computer set is optionally coupled to the battery unit, the sets of battery terminals and power terminals are coupled electrically to the battery unit so as to permit the battery unit to supply a second electrical power via the power diverter circuit.

In one embodiment of the present invention, the disk drive includes a disk reading module and a second disk-drive connecting port such that when the computer set is optionally coupled to the disk drive, the second disk-drive connecting port is coupled electrically with the first disk-drive connecting port so that a disk-drive data can be transmitted to the computer set via the set of disk terminals in the first disk-drive connecting port and the first power source supplies the first electrical power to the disk drive via the power diverter circuit and the power terminals in the first disk-drive connecting port.

In one embodiment of the present invention, the battery unit includes a battery connecting port such that when the computer set is optionally coupled to the battery unit, the battery connecting port is coupled electrically with the first disk-drive connecting port so that the second electrical power P6 is supplied to the computer set via the power diverter circuit and the power terminals in the first disk-drive connecting port and that a battery data is transmitted to the computer set via the power terminals in the first disk-drive connecting port.

In another embodiment of the present invention, computer set further includes a power supply track, which is coupled electrically with the power diverter circuit and via which the second electrical power is supplied to the computer set when the computer set is optionally coupled to the battery unit. In addition, the power diverter circuit includes a first LED member and a second LED member. The first LED member has a positive end coupled electrically to the first power source and a negative end coupled electrically to the set of power terminals. The second LED member has a positive end coupled electrically to the power supply track and a negative end coupled electrically to the set of power terminals.

In yet another embodiment of the present invention, the number of terminals in the first disk-drive connecting port is equivalent to the number of terminals in the conventional disk-drive connecting port.

A battery unit of the present is in the shape of a disk drive and is adapted to be applied in a computer set. The battery unit includes a battery connecting port having a set of power transmission terminals for coupling electrically with the set of power terminals in the first disk-drive connecting port so as to supply the second electrical power for the computer set; and an extra set of battery terminals for coupling electrically with the set of battery terminals in the first disk-drive connecting port so as to transmit the battery data to the computer set.

In compare to the prior art notebook computer, the computer set of the present invention can accommodate a battery unit therein without installing a new disk-drive connecting port, thereby providing the present computer set with an additional power source and simultaneously providing flexible use of the interior space of the present computer set. In other words, the present computer set has a relatively large interior space for circuit layout when compared to the prior art ones.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
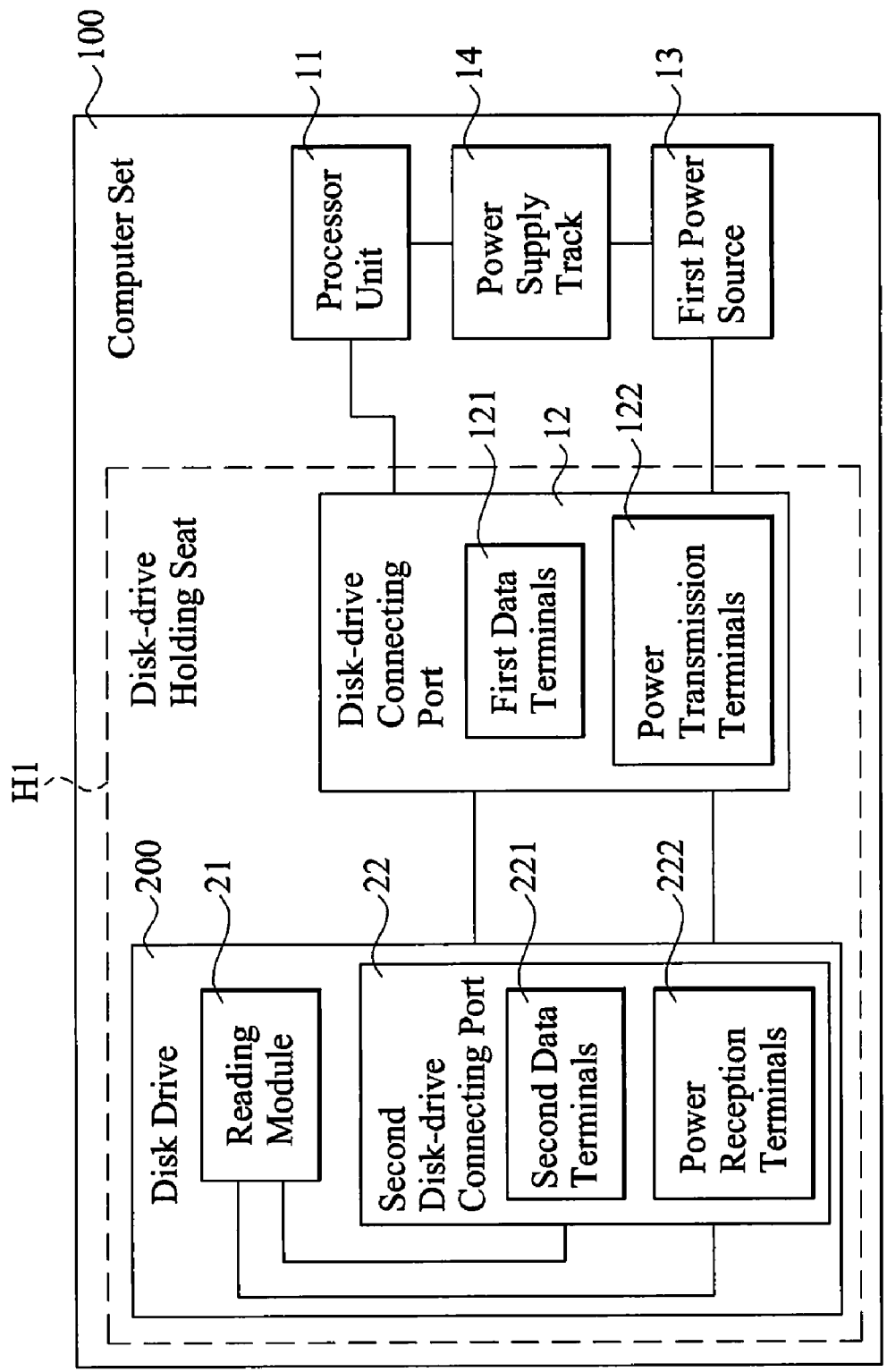
FIG. 1 illustrates a diagram representing a prior art computer set provided with a disk drive.
Figure 2:
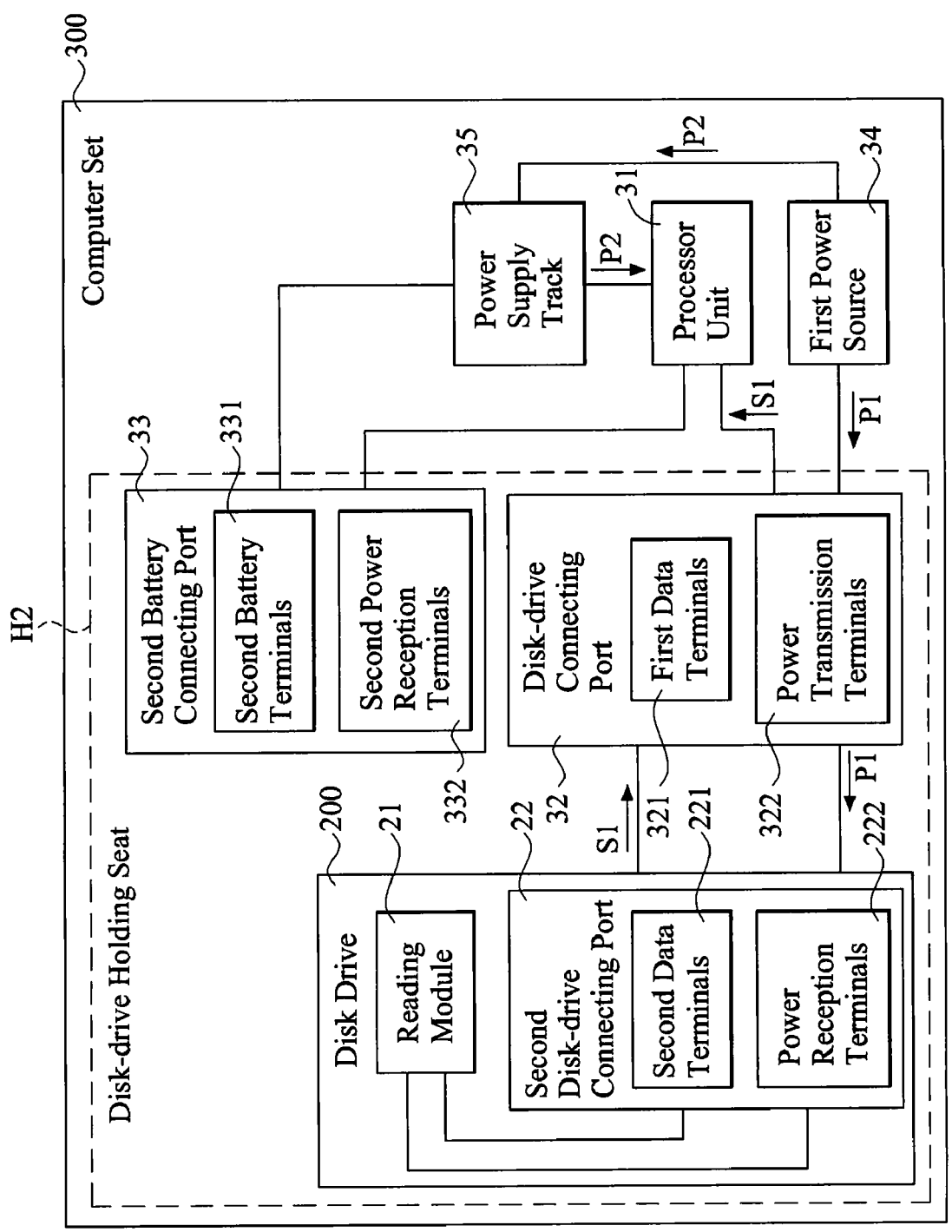
FIG. 2 illustrates a diagram representing another prior art computer set provided a second battery connecting port and into which a disk drive is inserted.
Figure 3:
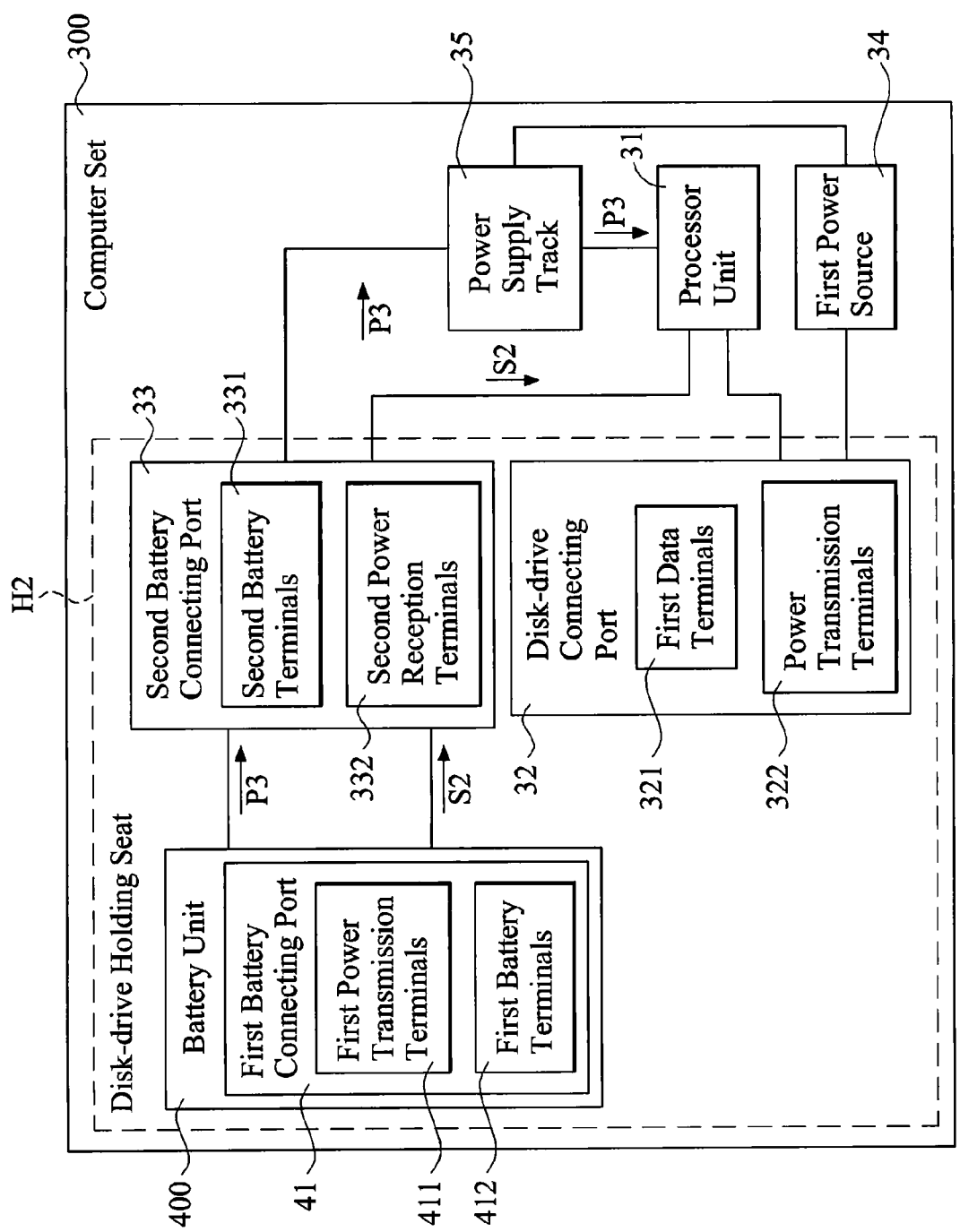
FIG. 3 illustrates a diagram representing another prior art computer set provided a second battery connecting port and into which a battery unit in the shape of a disk drive is inserted.
Figure 4:
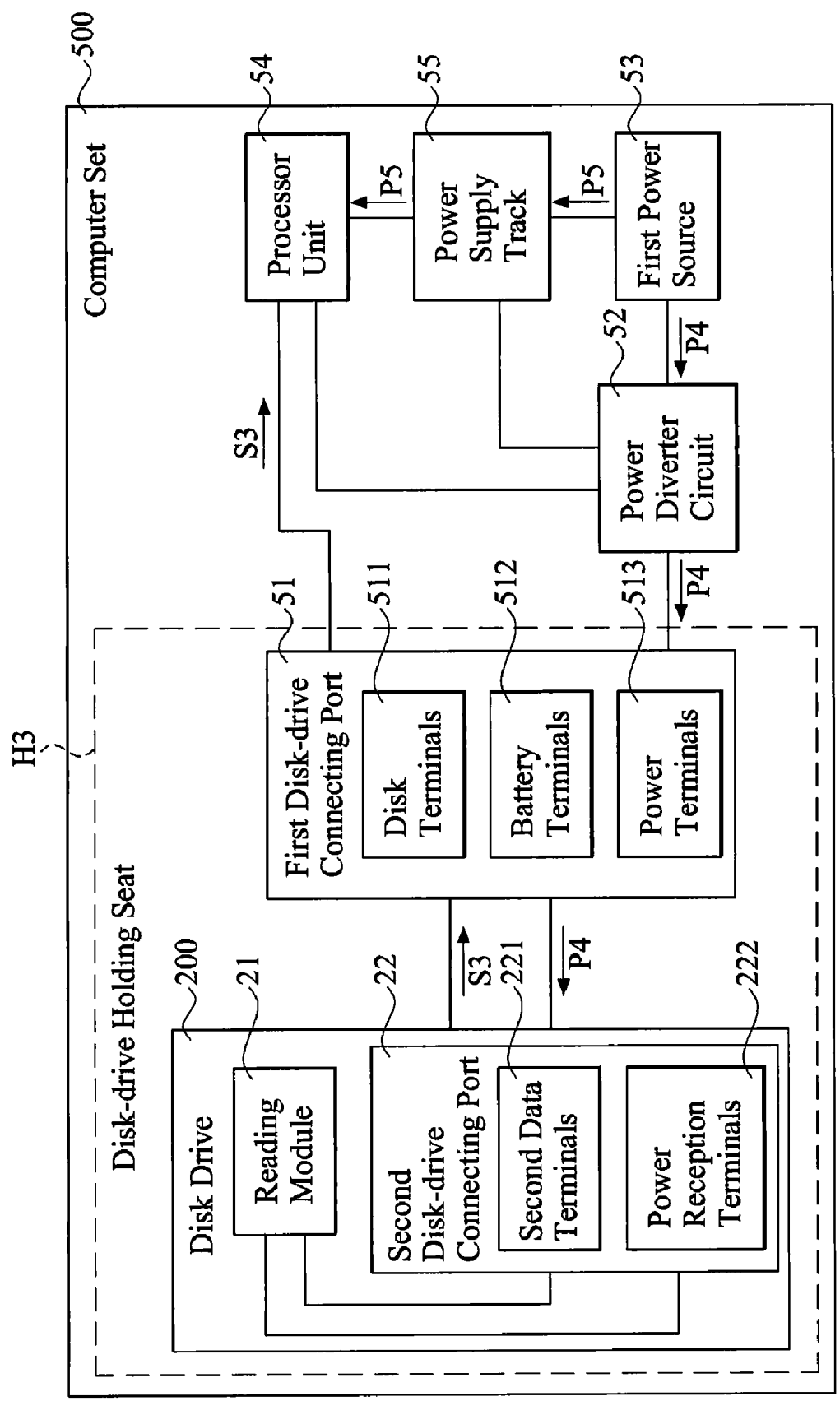
FIG. 4 illustrates a diagram representing a computer set of the present invention and is installed with a disk drive.
Figure 5:
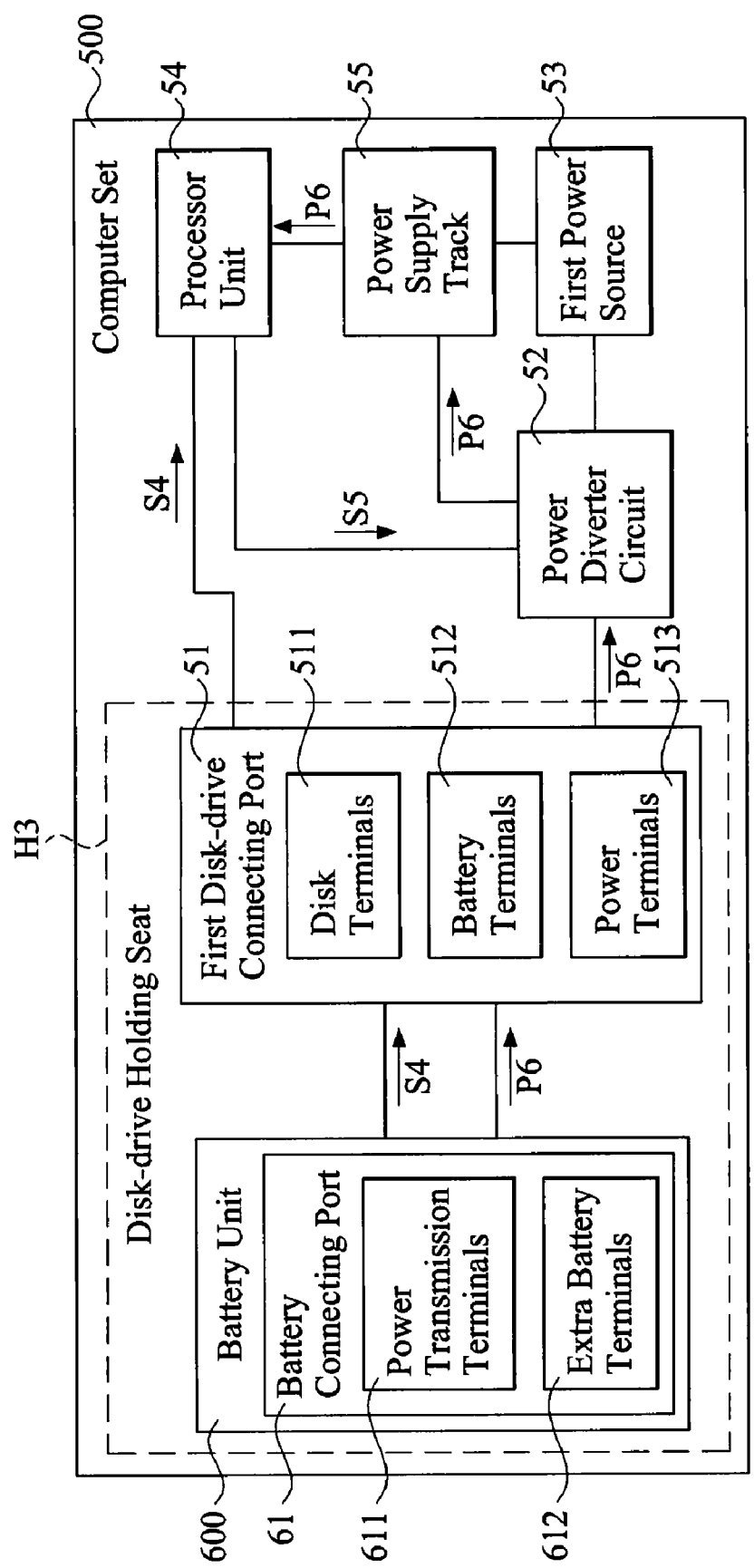
FIG. 5 illustrates a diagram representing a computer set of the present invention and is installed with a battery unit in the shape of a disk drive.

Referring to FIGS. 4 and 5, wherein FIG. 4 illustrates a diagram representing a computer set of the present invention and is installed with a disk drive and FIG. 5 illustrates a diagram representing the a computer set of the present invention and is installed with a battery unit in the shape of a disk drive. The computer set 500 of the present invention is adapted be coupled optionally to an optical disk drive 200 and a battery unit 600 in the shape of a disk drive. The computer set 500 accordingly includes a first disk-drive connecting port 51, a power diverter circuit 52 and a first power source 53.

The first disk-drive connecting port 51 includes a set of disk terminals 511, a set of battery terminals 512 and a set of power terminals 513, wherein, in one preferred embodiment, a total number of the disk terminals 511, the battery terminals 512 and the power (transmission and reception) terminals 513 is equivalent to a combined number of the first disk terminals 121 and the power transmission terminals 122 in the conventional disk-drive connecting port. The first disk-drive connecting port 51 is installed within the holding seat H3 of the computer set 500 while the first power source 53 is coupled electrically with the power diverter circuit 52 such that when the computer set 500 of the present invention is optionally and electrically coupled to the disk drive 200, a first electrical power P4 is supplied to the disk drive 200 via the power diverter circuit 52.

The present computer set 500 includes a processor unit 54 and a power supply track 55. The processor unit 54 is coupled electrically to the first disk-drive connecting port 51 and the power supply track 55, which, in turn, is electrically coupled to the power diverter circuit 52 and the first power source 53 such that when the present computer set 500 is optionally coupled to the disk drive 200, the first power source supplies a main electrical power to those electronic components (not shown) in the present computer set.

When the present computer set 500 is optionally coupled to the disk drive 200, the sets of disk terminals 511 and power terminals 513 in the first disk-drive port 51 are coupled electrically with the disk drive. Under this condition, the second disk-drive connecting port 22 is coupled electrically with the first disk-drive connecting port 51 such that the set of second data terminals 221 is electrically coupled with the set of first data terminals 121 while the set of power reception terminals 222 is coupled electrically with the set of power terminals 513 so as to transmit the disk data S3 to the processor unit 54 via the first disk-drive connecting port 51. Meanwhile, the first power source 53 supplies the first electrical power P4 to the disk drive 200 via the power diverter circuit 52 and the power terminals 513 in the first disk-drive port 51.

When the present computer set 500 is optionally coupled to the battery unit 600, the sets of battery terminals 512 and power terminals 513 are coupled electrically to the battery unit 600 so as to permit the battery unit 600 to supply a second electrical power P6 via the power diverter circuit 52. Note that the battery unit 600 includes a battery connecting port 61 having a set of power transmission terminals 611 and an extra set of battery terminals 612 such that when the battery unit 600 is coupled electrically to the computer set 500, the battery connecting port 61 is coupled electrically with the first disk-drive connecting port 51 while the set of power transmission terminals 611 is coupled electrically with the set of power terminals 513 and the extra set of battery terminals 612 is coupled electrically with the set of battery terminals 512 so as to supply the second electrical power P6 for the computer set 500 via the power terminals 513 in the first disk-drive port 51, the power diverter circuit 52 and the power supply track 55. At the same time, a battery data S4 is transmitted to the computer set 500 via the set of battery terminals 512 in the first disk-drive port 51.

Figure 6:
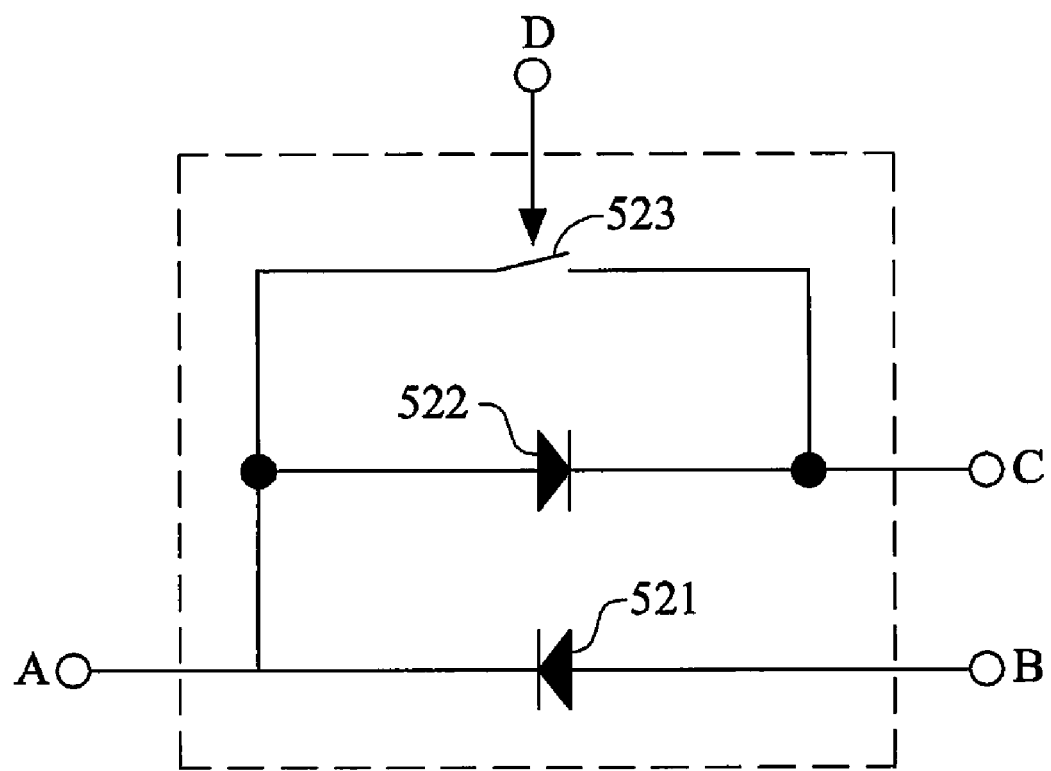
FIG. 6 shows a power diverter circuit employed in the computer set of the present invention.

FIG. 6 shows the power diverter circuit 52 employed in the computer set 500 of the present invention. As illustrated, the power diverter circuit 52 includes a first LED member 521 and a second LED member 522. The first LED member 521 has a positive end coupled electrically to a distal B point of the first power source 53 and a negative end coupled electrically to a distal A point of the set of power terminals 513. The second LED member 522 has a positive end coupled electrically to a distal point C of the power supply track 55 and a negative end coupled electrically to the distal point A of the set of power terminals 513.

When the computer set 500 utilizing the aforesaid power diverter circuit 52 is coupled electrically with the disk drive 200, the first electrical power P4 from the first power source 53 is supplied to the disk drive 200 via the distal point B, the first LED member 521, the distal point A and the set of power terminals 513. When the computer set 500 is coupled electrically with the battery unit 600, the second electrical power P6 from the battery unit 600 is supplied to the processor unit 54 and the other electronic components in the computer set 500 via the set of power terminals 513, the distal point A, the second LED member 522, the distal point C and the power supply track 55.

Preferably, the power diverter circuit 52 further includes an On/Off switch 523 that is coupled electrically to an adjoining point of the power supply track 55 and the set of power terminals 513 and that is communicated electrically with the processor unit 54 such that the On/Off switch 523 is switched to On or Off mode upon receipt of a switch signal S5 from the processor unit 54. For instance, upon receipt of the battery data S4, the processor unit 54 will transmit the switch signal S5 to the On/Off switch 523, thereby permitting communication between the power supply track 55 and the set of power terminals 513 so that the second electrical power P6 is not required to pass through the second LED member 522, thereby preventing current loss and enhancing the power capacity.

As illustrated above, the computer set of the present invention can accommodate the battery unit in the form of the disk drive without the necessity of an extra connecting port, thereby permitting a flexible use of the interior space of the computer set. In other words, the expense of constructing new connecting can be economized during the production process.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A computer set for optionally coupled to an optical disk drive and a battery unit in the shape of a disk drive, the computer set comprising:
    a first disk-drive connecting port including
        a set of disk terminals,
        a set of battery terminals, and
        a set of power terminals;
    a power diverter circuit coupled electrically to said first disk-drive connecting port; and
    a first power source for electrically coupled to said power diverter circuit when the computer set is optionally coupled to the disk drive so as to permit said power diverter circuit to supplies a first electrical power P4 for the disk drive 200;
    wherein, when the computer set is optionally coupled to the disk drive, the sets of disk terminals and power terminals are electrically coupled to the disk drive and when the computer set is optionally coupled to the battery unit, the sets of battery terminals and power terminals are coupled electrically to the battery unit so as to permit the battery unit to supply a second electrical power via said power diverter circuit.

2. The computer set according to claim 1, wherein the disk drive includes a disk reading module and a second disk-drive connecting port such that when the computer set is optionally coupled to the disk drive, said second disk-drive connecting port is coupled electrically with said first disk-drive connecting port so that a disk-drive data can be transmitted to the computer set via said set of disk terminals in said first disk-drive connecting port and said first power source supplies said first electrical power to the disk drive via said power diverter circuit and said power terminals in said first disk-drive connecting port.

3. The computer set according to claim 1, wherein the battery unit includes a battery connecting port such that when the computer set is optionally coupled to the battery unit, said battery connecting port is coupled electrically with said first disk-drive connecting port so that said second electrical power is supplied to the computer set via said power diverter circuit and said power terminals in said first disk-drive connecting port and that a battery data is transmitted to the computer set via said power terminals in said first disk-drive connecting port.

4. The computer set according to claim 1, further comprising a power supply track which is coupled electrically with said power diverter circuit and via which said second electrical power is supplied to the computer set when the computer set is optionally coupled to the battery unit.

5. The computer set according to claim 4, wherein said power diverter circuit includes a first LED member and a second LED member, said first LED member having a positive end coupled electrically to said first power source and a negative end coupled electrically to said set of power terminals, said second LED member having a positive end coupled electrically to said power supply track and a negative end coupled electrically to said set of power terminals.

6. The computer set according to claim 5, further comprising a processor unit, said power diverter circuit further including an On/Off switch that is coupled electrically to an adjoining point of said power supply track and said set of power terminals and that is communicated electrically with said processor unit such that said On/Off switch is switched to On or Off mode upon receipt of a switch signal from said processor unit.

7. A battery unit in the shape of a disk drive and adapted to be applied in the computer set defined in claim 1, the battery unit including a battery connecting port comprising:

a set of power transmission terminals for coupling electrically with said set of power terminals in said first disk-drive connecting port so as to supply said second electrical power for the computer set; and an extra set of battery terminals for coupling electrically with said set of battery terminals in said first disk-drive connecting port so as to transmit said battery data to the computer set.

* * * * *